3,213,143
ISOLATION PROCESS FOR METHYL ALKYL
TERTIARY AMINES
Harlan T. Fallstad, Minneapolis, Minn., assignor to Archer-Daniels-Midland Company, Minneapolis, Minn., a corporation of Delaware
No Drawing. Filed July 30, 1962, Ser. No. 213,135
5 Claims. (Cl. 260—570.9)

This invention relates to a process for preparing tertiary amines of the types $R_nN(CH_3)_{3-n}$ in which R is a long chain alkyl or aralkyl hydrocarbon group containing from 6 to 26 carbon atoms and $n$ is a positive integer not greater than two. More particularly this invention relates to an improved method of separating the tertiary amine product from the reaction materials and the near quantitative yields obtained therefrom.

The methylation of amines and ammonia by formic acid and formaldehyde is known to the art. Kirby (U.S.P. 2,366,534) applied this reaction to long chain amines. Valko (Canada 464,856) improved Kirby's process by using an inert solvent which greatly reduced the foaming problem disclosed in Kirby's patent. Erickson (U.S.P. 2,776,314) disclosed that sulfuric acid may replace some of the formic acid. This is claimed to reduce foaming problems, inccrease yield and cheapen the process.

The reaction as described by the above patents is carried out by methylating a primary or secondary amine with formic acid and formaldehyde. The reaction product is a methylated amine salt which is then converted to the free amine by tedious and the time consuming neutralization, washings and drying.

It has now been discovered that a greatly simplified product isolation procedure can be used which converts the amine-acid salts into free tertiary amines and volatilizes the decomposition products and unreacted materials.

This new product isolation procedure as herein described has numerous advantages over those known to the art.

Some of the advantages of this new process over the prior art are the reduced costs in that neutralization agents are not required and that several steps as described in the art are eliminated. The reaction and product isolation may be carried out in the same vessel instead of transferring the mixture to other vessels. Also, the time for product isolation is reduced. Emulsion problems that occur during the washing steps are eliminated since washing is not necessary, and near quantitative yields of tertiary amines may be obtained.

It is therefore an object of this invention to provide a new and simplified process for the isolation of methyl alkyl tertiary amines from the reaction mixture.

Another object of this invention is the method of obtaining near quantitative yields of the free tertiary amine.

A further object of this invention is the elimination of several time consuming and costly steps that have been used previously in isolating the free tertiary amine.

To accomplish the foregoing and related ends, this invention then comprises the features hereinafter more fully described and inherent therein, and as particularly pointed out in the claims, the following description setting forth in detail certain illustrative embodiments of the invention and improvement, these being indicative, however, of but a few of the various ways in which the principle of the invention may be employed.

The process of this invention is carried out by reacting primary or secondary amines with formic acid and formaldehyde in the presence of an inert solvent in a manner similar to that shown by Valko and Kirby. After the reaction is completed, the temperature is raised and the inert solvent, excess of formic acid, excess of formaldehyde and the water of reaction are distilled out of the reaction mixture. The temperature is then raised to about 180° to 200° C. to decompose the amine formic acid salts. This pyrolysis reaction liberates the free tertiary amine, the volatile decomposition products being removed in the gaseous phase.

The reaction of this invention may be shown by the equation

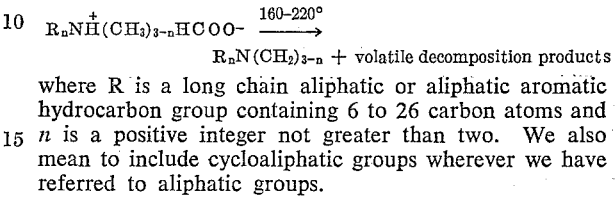

$$R_nN(CH_2)_{3-n} + \text{volatile decomposition products}$$

where R is a long chain aliphatic or aliphatic aromatic hydrocarbon group containing 6 to 26 carbon atoms and $n$ is a positive integer not greater than two. We also mean to include cycloaliphatic groups wherever we have referred to aliphatic groups.

By this process the free tertiary amine is obtained in yields up to about 99% of theoretical. This method eliminates the tedious neutralization washing and drying steps which in the past have reduced yields considerably through losses resulting from emulsification.

The quality and color of the product is generally not adversely effected by this isolation process compared to the old neutralization procedure.

The temperature at which the amine salt will decompose to the free methyl alkyl teritary amines is dependent on the compounds employed. This temperature varies from about 160° C to about 220° C. and generally is in the range of 180° to 200° C.

The time required to complete this pyrolysis varies from about 1 hour to about six hours or more depending on the temperature and the amine being isolated. Reduced pressure, inert gas sparge or other methods may be used to drive out the volatile decomposition products.

Foaming is suppressed through the employment of an organic liquid which is inert in the sense that it does not enter into the reaction between the amine and the methylating agents.

The inert solvent used is preferably of the water immiscible type such as hexane, toluene and the like. This enables the solvent to be reused by merely separating the immiscible phases. Water miscible solvents such as isopropanol may also be used but recovery of the solvent would be more difficult.

The tertiary amines which this invention contemplates in the isolation process are those containing at least one hydrocarbon group of 6 to 26 carbon atoms. The hydrocarbon group may be a long chain aliphatic group or an aliphatic-aromatic group containing 6 to 26 carbon atoms, the aliphatic group being the one attached to the nitrogen and atom of the amine. The tertiary amines are prepared from the primary, secondary or mixtures of primary and secondary amines. The hydrocarbon groups in the secondary amines may be alike or different. The amines used in preparation of the teritary amines may also be polyamines, amido amines or ether amines.

Commercially these amines may be derived from the natural fats and oils or from petroleum sources.

The following examples are given to illustrate but not to limit the invention. All parts are given by weight.

*Example I*

This example illustrates the method of isolating a methyl dialkyl amine obtained by the methylation of a secondary amine to a tertiary amine.

106.6 parts (0.2 mole) of a secondary amine derived from hydrogenated tallow was melted and added to a stirred solution of 17.8 parts (0.22 mole) of 37% aqueous formaldehyde in 108 parts of isopropanol. The temperature of the mixture rose from 23° C. to 50° C. during the addition to amine. 22.5 parts (0.44 mol) of 90% aqueous formic acid was added. The temperature of the mixture rose from 46° C. to 54° C. and carbon dioxide evolution started. The temperature was then raised and refluxing occurred at 82° C. The mixture was refluxed at 82° C. for 5⅙ hours. The refluxing condenser was then turned downward for distillation and the inert solvent, excess formic acid, excess formaldehyde and water were distilled out of the mixture.

The temperature was then raised to 180° C. and held between 180° C. and 195° C. for one hour. The mixture was cooled and further isolation was not necessary. Analysis of the product indicated that it contained about 99% tertiary amine and about 0.5% amine formate. The yield was near quantitative.

*Example II*

This example illustrates the method of isolating a dimethyl alkyl amine obtained by the methylation of a primary amine to a tertiary amine.

786 parts (3.0 moles) of primary hydrogenated tallow amine was melted and added to a stirred solution of 535 parts (6.6 moles) of 37% aqueous formaldehyde and 506 parts toluene. 506 parts (9.9 moles) of 90% formic acid was then added to the mixture from a dropping funnel. $CO_2$ began evolving rapidly. The temperature was increased and refluxing occurred at 85° C. After 1.8 hours $CO_2$ evolution had stopped, indicating that the reaction was substantially finished. The reflux condenser was then turned downward for distillation and the inert solvent, excess formic acid, excess formaldehyde and water were distilled out of the reaction flask.

The temperature of the reaction product was then raised to 185° C. and held between 185° and 195° C. for six hours. A nitrogen sparge was used to aid in the removal of the volatile decomposition materials. The mixture was then cooled and analysis of the product indicated that it contained 87.0% of tertiary amine.

*Example III*

This example illustrates the method of isolating dimethyl arachidyl behenyl tertiary amine obtained by the methylation of the primary arachidyl behenyl amine to the tertiary amine.

1,713 parts (5.8 moles) of primary arachidyl behenyl amine was melted and added to a stirred solution of 423 parts (12.8 moles) of paraformaldehyde (91% formaldehyde) and 1000 parts toluene. 1,000 parts (19.1 moles) of 88% formic acid was added to the mixture. The reaction proceeded as illustrated in Example II. After pyrolysis of the reaction product, analysis indicated that most of the amine present was tertiary amine. The yield was 83.2% dimethyl arachidyl behenyl tertiary amine.

*Example IV*

This example illustrates the method of isolating a tertiary amine which contains an aromatic group.

380 parts of hydrogenated tallow benzyl amine was melted and added to a stirred solution of 33 parts of paraformaldehyde (91% formaldehyde) and 380 parts toluene. 101 parts of 90% formic acid was then added to the mixture from a dropping funnel. $CO_2$ evolved rapidly from the mixture. The temperature was increased and refluxing occurred at 127° C. After 4 hours the reaction was substantially completed. The reflux condenser was then turned downward for distillation and the toluene, excess formic acid, excess formaldehyde and water were distilled out of the reaction flask.

The temperature was then increased to 193° C. and held between 193° C. and 200° C. for four hours under reduced pressure. Analysis of the product indicated that it contained 90.5% methyl hydrogenated tallow benzyl amine.

This invention contemplates the herein described and illustrated method of isolating free methyl alkyl tertiary amines formed by methylating primary and secondary amines exemplified by the herein described reactions. The pyrolysis method of this invention has definite advantages over the known art. The simplicity, economy and high yields obtained by this method are the most significant advantages. It will be recognized by those skilled in the art that all of the hydrocarbon groups containing 6 through 26 carbon atoms are not listed and example shown for each. However, from the preferred examples illustrated the art will recognize applicable primary and secondary alkyl and aralkyl amines, and mixtures of the same wherein the hydrocarbon group, or groups, contain 6 through 26 carbon atoms.

As many variations and modifications of this invention as hereinto set forth may be made without departing from the spirit and scope thereof, the specific embodiments are given by way of the improvements provided which is to be limited only by the terms of the claims.

I claim:

1. The process of preparing and subsequently isolating tertiary amine having the structure:

$$R_nN(CH_3)_{3-n}$$

wherein R is a $C_6$–$C_{26}$ hydrocarbon radical selected from the group consisting of alkyl and aralkyl and wherein $n$ is a positive integer not greater than 2; comprising the steps of methylating a material selected from the group consisting of primary amines, secondary amines, and mixtures thereof, with formaldehyde and formic acid; thereby obtaining a crude reaction mixture which contains formate salt of said tertiary amine; subsequently heating said crude reaction mixture to remove volatile materials; further heating said reaction mixture to a decomposition temperature of said formate salt, said temperature being from about 160° to 220° C., thereby decomposing said salt; and removing volatile decomposition products, thereby isolating said tertiary amine.

2. The method of claim 1 wherein said methylation is carried out in the presence of water immiscible inert solvent.

3. The method according to claim 2 wherein said methylation is carried out at a temperature substantially below said range of about 160° C. to 220° C.

4. The method according to claim 3 wherein said methylation is carried out at a temperature on the order of from 20° C. to 125° C.

5. The method of isolating tertiary amines having the structure $R_nN(CH_3)_{3-n}$ in which R is a hydrocarbon group of 6 through 26 carbon atoms and selected from the group consisting of alkyl and aralkyl and $n$ is a positive integer not greater than 2 from a mixture of said tertiary amines with a tertiary amine formate salt comprising heating said mixture to the decomposition temperature of the tertiary amine salt to liberate the tertiary amines from the salt and remove volatile decomposition products from the tertiary amines in the mixture, said decomposition temperature being from 160° to 220° C.

References Cited by the Examiner

UNITED STATES PATENTS 2,251,245   7/41   Wegler  260—570.8

OTHER REFERENCES

Adams et al.: "Organic Reactions," vol. 5, chapter 7, by Moore, pages 301–308 and 316–318 (1949).

Baltzly et al.: "Journal American Chemical Soc.," vol. 62, pages 161–4 (1940).

Clarke et al.: "Journal American Chemical Soc.," vol. 55, pages 4571–87 (1933).

CHARLES B. PARKER, *Primary Examiner.*

UNITED STATES PATENT OFFICE
CERTIFICATE OF CORRECTION

Patent No. 3,213,143            October 19, 1965

Harlan T. Fallstad

It is hereby certified that error appears in the above numbered patent requiring correction and that the said Letters Patent should read as corrected below.

Column 1, line 10, for "types" read -- type --; line 23, for "problem" read -- problems --; line 26, for "inccrease" read -- increase --; line 32, strike out "the", second occurrence; column 2, lines 10 to 12, for that portion of the formula reading $$(CH_2) \quad\quad\quad \text{read} \quad\quad\quad (CH_3)$$

line 52, strike out "and"; line 72, for "to" read -- of the --.

Signed and sealed this 21st day of June 1966.

(SEAL)
Attest:

ERNEST W. SWIDER            EDWARD J. BRENNER
Attesting Officer            Commissioner of Patents